Patented Aug. 16, 1927.

1,638,960

UNITED STATES PATENT OFFICE.

JOSEPH PRIKELMAYER, OF VALJEVO, YUGOSLAVIA.

TRANSPARENT SEALING WAX.

No Drawing.    Application filed October 17, 1925. Serial No. 63,138.

This invention relates to sealing wax and in particular to the production of a sealing wax which is transparent and through which a signature or other identifying mark is readable.

A particular object of the invention is to provide a transparent sealing wax which can be made up in stick form and which has greater adhering qualities than the sealing wax in present day use.

A further object of the invention is to provide a sealing wax which can be spread over a signature or other reading matter to prevent eradication thereof without destroying the seals whereby tampering with an envelope or other sealed mailing matter will be made apparent.

My composition consists of a mixture of natural orange shellac, Venetian turpentine, colophony and mastic.

In preparing the composition, I prefer to use approximately 36 parts of natural orange shellac, 24 parts of clear filtered commercial Venetian turpentine, 6 parts of colophony water white and 3 parts of mastic resin. The mixture which is prepared hot, when cooling hardens and is molded into sticks and when adopted for use can be melted by warming at such temperatures that carbonization is prevented which usually occurs when the wax is burned, such for instance as in a match flame.

Also the transparent sealing composition can be thinly spread over a surface upon which has been written the signature of the dispatcher of the message and due to its transparent nature, the signature can be seen therethrough very clearly. Any attempt therefore to remove the seal would remove the signature as well, due to the great affinity of the sealing wax to the paper. In this way a perfect seal is provided for letters and the like.

Having described my invention what I claim as new and desire to secure by United States Letters Patent is, 1. A transparent sealing composition consisting of a mixture of natural orange shellac, Venetian turpentine, colophony water white, and mastic resin.

2. A transparent sealing composition consisting of a mixture of 36 parts of natural orange shellac, 24 parts of Venetian turpentine, 6 parts of colophony water white and 3 parts of mastic resin.

Signed at Belgrade in the county of Belgrade and State of Yugoslavia this seventeenth day of September A. D. 1925.

JOSEPH PRIKELMAYER.